United States Patent [19]
Hamid et al.

[11] 3,935,662
[45] Feb. 3, 1976

[54] ELECTRONIC INSECT TRAP
[75] Inventors: Michael Hamid; Emil Krush, both of Winnipeg; Roger Boulanger, Calgary, all of Canada
[73] Assignee: Alladin Enterprises Ltd., Winnipeg, Canada
[22] Filed: Oct. 25, 1974
[21] Appl. No.: 517,938

[52] U.S. Cl. .................................................. 43/112
[51] Int. Cl.² ........................................... A01M 1/22
[58] Field of Search ........................................ 43/112

[56] References Cited
UNITED STATES PATENTS

| | | | |
|---|---|---|---|
| 2,016,722 | 10/1935 | Levin | 43/112 |
| 2,401,815 | 6/1946 | Dalziel | 43/112 |
| 2,941,328 | 6/1960 | Streat | 43/112 |
| 3,321,862 | 5/1967 | Peek | 43/112 |
| 3,473,251 | 10/1969 | Kahn | 43/112 |
| 3,491,478 | 1/1970 | Gilbert | 43/112 |

*Primary Examiner*—Warner H. Camp
*Attorney, Agent, or Firm*—Stanley G. Ade

[57] ABSTRACT

An attractant such as an ultra-violet light is reflected from the trap and insects are thereby attracted and fly through a surrounding mesh to inside the trap. They are then stimulated by a high frequency electro-static field generated by an electronic unit within the trap, to fly towards an electrocuting grid. When an insect enters the grid, a high voltage short duration arc is struck which rapidly heats and dehydrates the insect thus killing same. This can be accomplished either with or without actual contact of the insect across the grid. The arc dissipates a fixed charge generated by the unit so that continuous arcing does not occur. Because of the dehydration effect, the insects drop from the grid and do not stick thereto. The electronic circuit is designed so that if a relatively large insect enters the grid, and the dehydration is not completed by the arc, dielectric heating will occur as a result of the moisture remaining thus completing the dehydration process.

6 Claims, 4 Drawing Figures

ELECTRONIC INSECT TRAP

BACKGROUND OF THE INVENTION

This invention relates to new and useful improvements in electronic insect traps designed primarily for use in the grounds surrounding residences, although of course it can be used in other locations such as food processing plants if desired.

Some insect traps in use, use chemicals and although these may be effective inside rooms and buildings, nevertheless the efficiency thereof decreases outdoors particularly if there is a breeze or wind blowing.

Electronic devices have been designed but these usually utilize electrocution which requires the insect to physically bridge the electrocuting elements. Several disadvantages are inherent in such devices, the first being that the insect tends to be "fried" onto the wires and continues to draw power as long as moisture is present. A gradual build up of insects upon the electrocuting grid therefore occurs. Another disadvantage is the relatively continuous power drawn by such devices which, of course, adds to the cost of operation.

The disadvantages of utilizing chemicals, particularly in outdoor locations, includes the danger of the chemically killed insects being eaten by birds, animals and the like thus transferring the chemicals to the food chain.

SUMMARY OF THE INVENTION

The present invention overcomes all of these disadvantages by providing a portable unit which can be plugged into conventional 110 AC power, or alternatively, can be battery operated.

The principal object and essence of the invention is to provide a device of the character herewithin described which utilizes an attractant such as ultra-violet light to attract the insects of the trap and which then uses a high frequency short duration arc to kill the insect and dehydrate it immediately so that it drops from the grid.

Another object of the invention is to provide a device of the character herewithin described which is designed to operate with an air gap between opposing members of the grid, an arc being struck across this air gap when same is reduced by a predetermined amount. In other words the insect does not actually have to bridge the gap between opposing elements but merely reduce the air gap so that the arc is struck.

Yet another object of the invention is to provide a device of the character herewithin described which, if a relatively large insect engages the grid, continues to dehydrate the insect after the arc has been struck, by dielectric heating means thus completing the dehydration process and allowing the insect to drop from the grid.

A still further object of the invention is to provide a device of the character herewithin described in which the main power is only drawn when the arc is struck but which provides a high frequency electro-static field to stimulate the insects to approach the electrocuting grid.

A still further object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

In the drawings like characters of reference indicate corresponding parts in the different figures.

DETAILED DESCRIPTION

Figure 1:
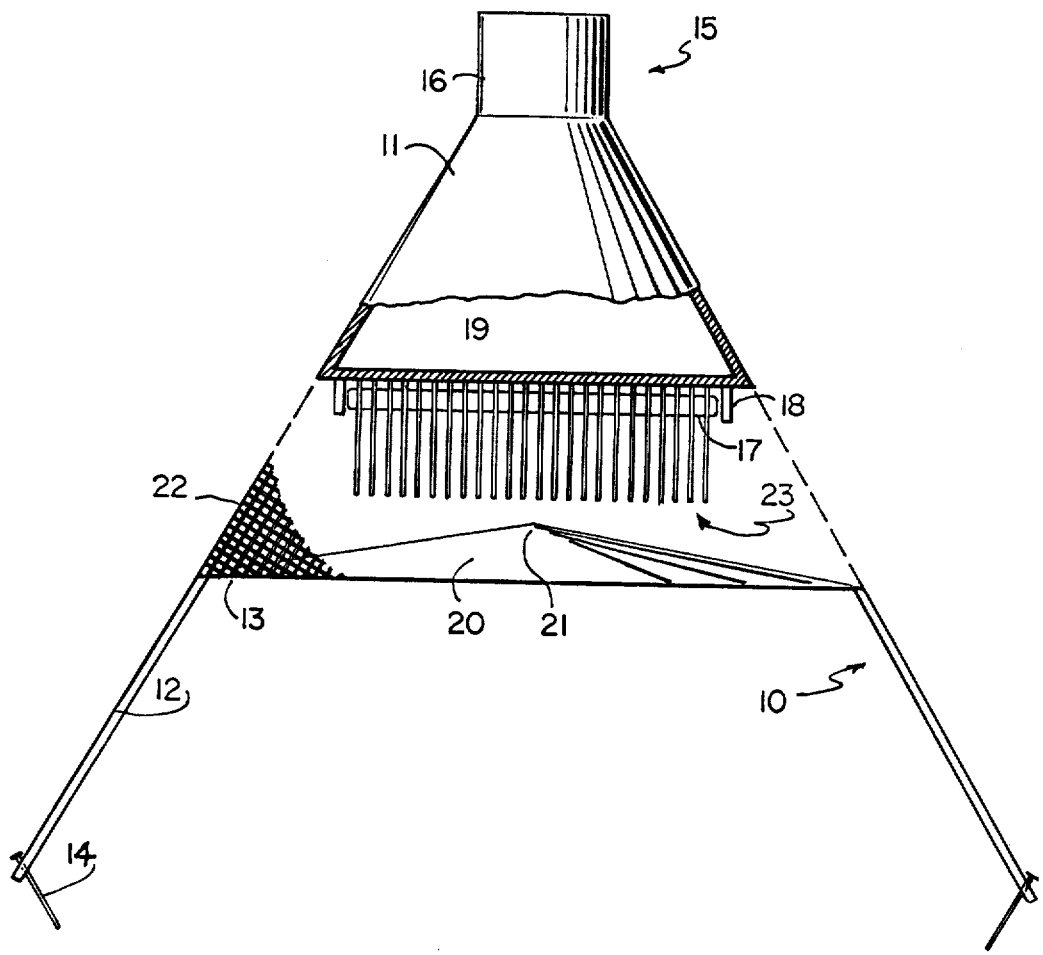
FIG. 1 is a side elevation partially fragmented of the device with parts shown schematically.

Proceeding therefore to describe the invention in detail, reference to the accompanying drawings will show supporting framework collectively designated 10 which, in this embodiment, includes a frusto-conical casing 11 supported above the ground or supporting surface, by a plurality of legs 12 which continue downwardly and outwardly from the lower edge 13 of the casing 11. These legs may be anchored to the ground as illustrated by reference character 14, to prevent the device being blown over by high winds or the like.

The electronic unit collectively designated 15 is included within an upper casing 16 secured to the upper side of the casing 11 but of course other shapes and arrangements of this casing may be used if desired.

An insect attractant is provided which in this embodiment, takes the form of a fluorescent tube 17 capable of producing ultra-violet light and extending between the tube supports 18 which depend from a flat disc reflector 19, details of which will hereinafter be described.

The fluorescent tube is operatively connected to the source of electrical energy by means that are conventional so that further details are not believed necessary in this description.

The flat disc reflector 19, constitutes an upper reflector which spans the casing 11 spaced from the lower side 13 thereof and is adapted to lie horizontally when the device is supported upon a horizontal surface.

A lower reflector 20 spans the lower side 13 of the casing 11 and is in the form of a conical disc reflector with the apex 21 extending upwardly towards the center of the upper disc 19. The attachment of the upper and lower discs to the casing is conventional and may take any form desired depending upon design parameters.

It is desirable that the opposing surfaces the upper and lower reflectors 19 and 21 be of a matt reflective finish so that ultra-violet light generated by the fluorescent tube 17, is reflected downwardly from the upper disc onto the conical surface of the lower reflector and then radially outwardly all around the device.

A protective screen 22 forms the lower part of the casing 11 and extends between the upper and lower reflectors 19 and 20 and this screen is apertured as shown with the apertures being of sufficient size to permit the entry of insects therethrough but to prevent undesirable physical contact by personnel with the interior of the device.

A protective screen is preferably made from a reflective material so that the combination of this screen and the upper and lower reflectors 19 and 20, produces a glow of ultra-violet light when the fluorescent tube is energized.

Situated within the area bounded by the protective screen and surrounding the source of ultra-violet light, is a killing grid collectively designated 23.

Figure 4:
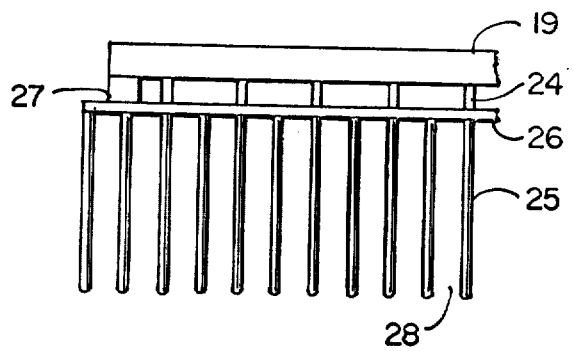
FIG. 4 is an enlarged fragmentary side elevation showing one method of mounting the electrocuting grid.

In the present embodiment it comprises opposing members 24 and 25 connected to the electronic circuit 15 as will hereinafter be described. FIG. 4 gives one method of mounting and forming the electrocuting or killing grid in which members 24 comprise wires secured to and extending downwardly from the upper disc reflector 19 and surrounding the tube 17 in the form of a ring. A support 26 is supported just below the disc 19 by means of insulators 27 and the members 25 extend downwardly from this support 26 in alternate arrangement with the members 24 but spaced slightly inwardly therefrom thus producing a plurality of air gaps 28 between the members 24 and 25 and these members 24 and 25 are in spaced and parallel relationship one with the other as clearly illustrated. They extend towards the lowermost screen 20 and terminate spaced thereabove as shown schematically in FIG. 1.

Figure 2:
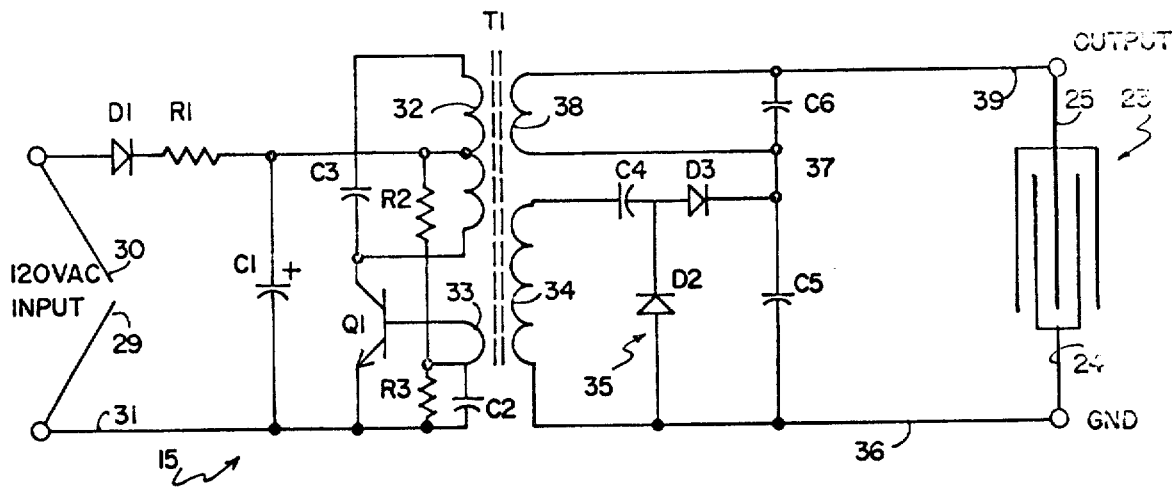
FIG. 2 is a wiring diagram of the electronic circuitry.

FIG. 2 shows the electronic circuit 15 which is connected to the killing grid 23 as will hereinafter be described.

In this particular embodiment, the input 29 is from 120 volt AC and this input is half wave rectified by a diode D1 as shown and filtered by the electrolytic capacitor C1 across lines 30 and 31.

Resistor R1 limits the surge current during the switching on of power and the resultant DC voltage is fed to a Class C oscillator consisting of transistor Q1, transformer T1 and a tank capacitor C3. Resistors R2 and R3 provide the necessary biasing voltage for the base of the transistor Q1 and capacitor C2 ensures a low source impedance for the feedback.

The transformer T1 is a ferrite core device having a total of four windings. The tapped winding 32, to which line 30 is connected, serves as the primary winding for the transformer and this tapped arrangement provides high circuit Q without excessive tank circulating currents.

A one turn winding serves as a source of positive feedback required by the oscillator and connected as illustrated.

The secondary winding 34 provides the high voltage for the volter doubler circuit collectively designated 35. This voltage doubler circuit includes diodes D2 and D3 with capacitors C4 and C5 inserted as clearly illustrated in FIG. 2 with one side being connected to the ground line 36 and the other side to the output line 37.

The values of capacitors C4 and C5 are chosen so that the correct charge is dissipated by the insects for the dehydration process when they approach or span the air gap 28 between the elements 24 and 25.

A fourth winding 38 is provided on transformer T1 along with a resonating capacitor C6 and this winding is connected in series with the output of the voltage doubler through line 37, to the main output line 39. This output line 39 is connected to elements 25 of the electrocuting grid and the ground or other line 36 is connected to the element 24 of this grid.

This arrangement therefore superimposes the AC voltage from winding 38 onto the DC voltage produced by winding 34.

The oscillator produces a high frequency voltage in the neighborhood of 25 KHz and the high frequency step up transformer serves as a tank circuit for the oscillator and steps up the voltage to around 2,000 volts peak in this particular embodiment. The voltage doubler circuit 35 converts this to 4,000 volts DC for energizing the electrocution grid.

The fourth winding 38 superimposes the 25 KHz AC voltage onto the DC voltage and results in an output voltage varying from 3,500 volts to 4,500 volts at a 25 KHz rate in this particular embodiment. It will of course be appreciated that other values can be chosen and that these are purely for explanatory purposes.

In operation, the device is connected to the source of electrical energy and a high frequency electro-static field is generated at the aforementioned frequency of approximately 25 KHz. However it has been found that fields having frequencies from between 10 KHz to 50 KHz appear to be equally effective.

At the same time the source of ultra-violet light is energized and the glow eminating from the device attracts insects thereto.

The matt finish on the discs diffuses the light and provides more even light distribution around the device and this light is diffused outwardly through the metal screen 22.

The resultant glow has been found very effective in attracting night flying insects and it should also be observed that the elevation of the screen above the ground is preferably chosen to match the height at which most insects such as mosquitoes fly. This has been found to be between 2 and 3 feet above ground level but of course depends on design parameters for the supporting structure 10.

Once the insects pass through the mesh screen 22, they are stimulated by the high frequency electro-static field generated by the electronic unit 15.

The destruction of insects entering the trap is accomplished by the rapid heating of the insects by a high voltage arc between the two elements 24 and 25 of the killing grid.

The voltage applied and the spacing between the elements has been chosen such that actual physical contact with the elements is not necessary for the insect to be destroyed.

Since insects are electrical conductors, their presence adjacent to or between the wires has the effect of reducing the air gap 28 between the wires or elements resulting in ionization of the insect thus causing internal heating. This heating effect dehydrates the insect rapidly thus causing immediate death.

The electronic circuit 15 is designed so that a fixed charge is dissipated by the arc between the elements so that continuous arcing does not result.

Since flies and mosquitoes have very little mass, the charge required for dehydration is accordingly small. Therefore the size of capacitors C4 and C5 is chosen to provide an arc of short duration after which the voltage between the grid elements 24 and 25 drops thereby extinguishing the arc and reducing the electric field. The dead insect falls from the grid and the voltage is allowed to increase to its original level.

However, if a large insect should come into contact with the grid, and the dehydration is not completed by the arc, sticking will occur as a result of the moisture remaining in the insect. However, since the 25 KHz on the fourth winding 38 is superimposed on the killing voltage from the doubling circuits 35, dielectric heating will occur which will complete the dehydration process thus allowing the insect to fall from the grid and allowing the voltage to return to its normal level.

Figure 3:
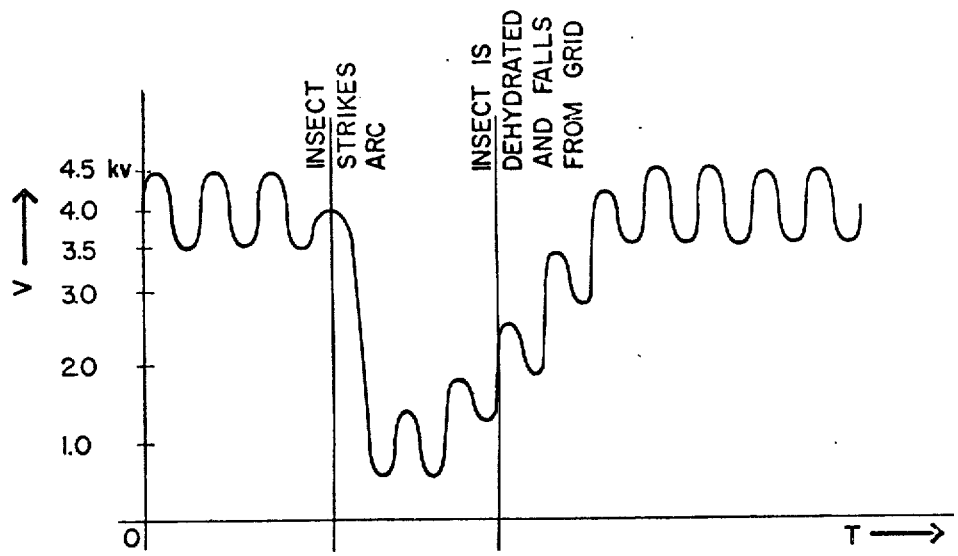
FIG. 3 shows the output wave form before, during and after the electrocution process.

FIG. 3 shows the output wave form before, during and after the electrocution process and is believed to be self-explanatory.

Although the source of electrical energy is shown to be 120 VAC, nevertheless it will be appreciated that the electronics can be adapted for use with other voltages either supplied from line power or from batteries.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What we claim as our invention is:

1. An insect trap connectable to a source of electrical power and comprising in combination a supporting framework, insect attractant means supported by said framework, electronic means supported within said framework and a killing grid operatively connected to said electronic means and also supported within said framework in the vicinity of said insect attractant means, said grid including opposing members having an air gap therebetween, said electronic means supplying electrical power to said grid whereby an arc is struck across said opposing members when an insect reduces the air gap therebetween by a predetermined amount, said insect attractant means including a source of ultra-violet light in said framework, an upper reflector in said framework above said source of ultra-violet light and a lower reflector below said source of ultra-violet light, said killing grid being situated between said reflectors and between said source of ultra-violet light and the exterior of said framework, said upper reflector including a substantially planar disc spanning said framework, said lower reflector including a substantially conical disc also spanning said framework in spaced relationship to said upper disc and with the apex of said conical disc extending towards said upper disc adjacent the center thereof whereby the ultra-violet light from said source thereof is reflected down from said upper reflector onto said lower reflector and radiated outwardly from said lower reflector.

2. The device according to claim 1 in which said electronic means includes means to produce a fixed charge dissipated by said arc.

3. The device according to claim 2 in which said electronic means includes a half wave voltage doubler circuit and means to produce a high frequency AC voltage, and means to superimpose said high frequency AC voltage upon the fixed charge dissipated by said arc.

4. The device according to claim 3 which includes a foraminated screen surrounding said upper and lower reflectors and said source of ultra-violet light and said killing grid, the openings in said screen being of sufficient size to permit entry therethrough of insects being attracted, said screen being formed of reflective material.

5. The device according to claim 2 which includes a foraminated screen surrounding said upper and lower reflectors and said source of ultra-violet light and said killing grid, the openings in said screen being of sufficient size to permit entry therethrough of insects being attracted, said screen being formed of reflective material.

6. The device according to claim 1 which includes a foraminated screen surrounding said upper and lower reflectors and said source of ultra-violet light and said killing grid, the openings in said screen being of sufficient size to permit entry therethrough of insects being attracted, said screen being formed of reflective material.

* * * * *